March 21, 1933. J. C. McCUNE 1,901,918
SAFETY CAR EQUIPMENT
Filed April 21, 1930
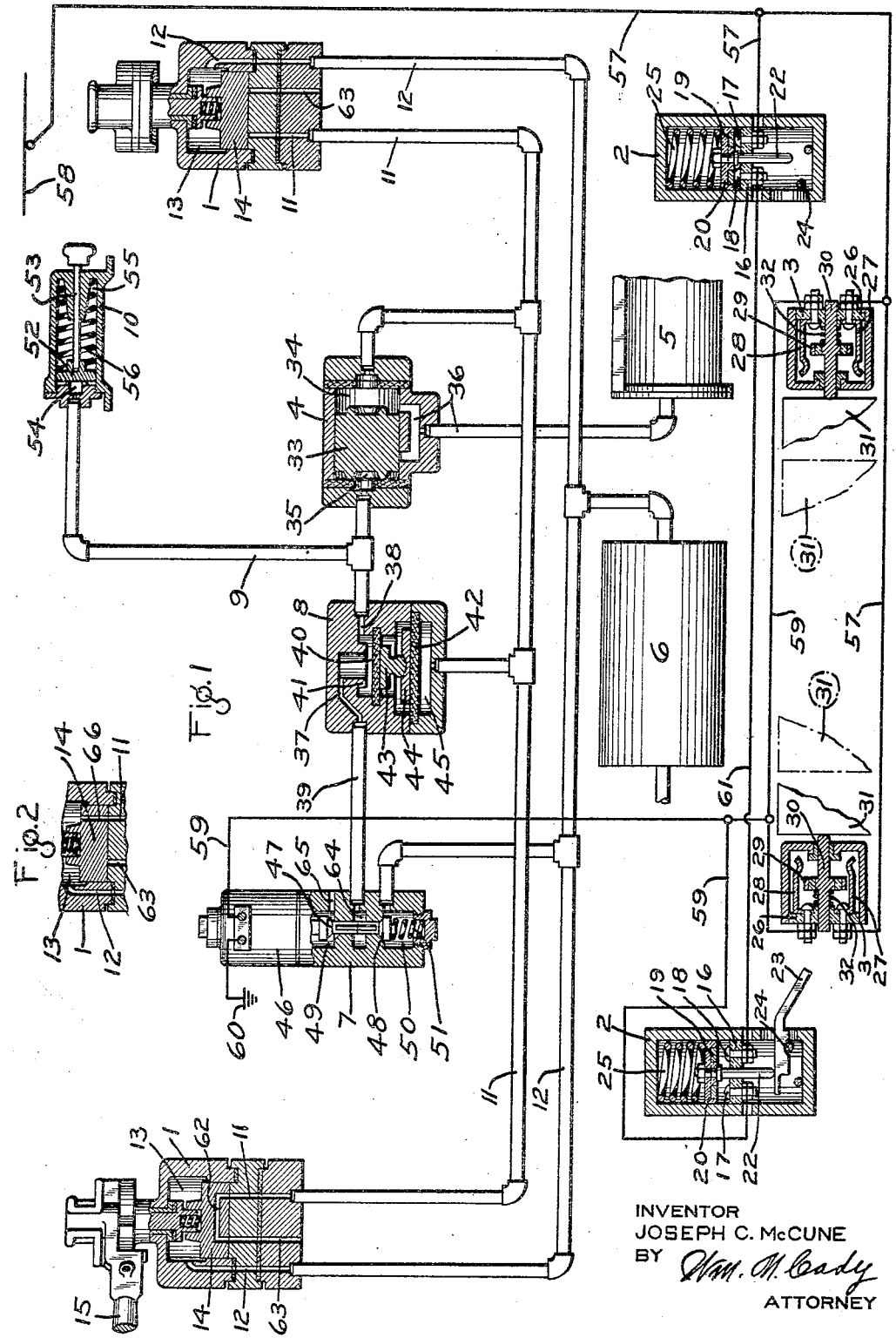
INVENTOR
JOSEPH C. McCUNE
BY Wm. M. Cady
ATTORNEY Patented Mar. 21, 1933

1,901,918

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed April 21, 1930. Serial No. 445,859.

This invention relates to fluid pressure brakes and more particularly to that type known as safety car control equipment.

The principal object of my invention is to provide a novel straight air safety car control equipment.

Another object of my invention is to provide a straight air safety car control equipment having electrically controlled means for effecting an application of the brakes upon the incapacitation of an operator or if a door of the car is opened.

A further object of my invention is to provide a safety car control equipment having a straight air pipe and a safety control pipe through either of which fluid under pressure is adapted to be supplied to and released from the brake cylinder and having a double check valve device interposed between said pipes and the brake cylinder for controlling communication between the brake cylinder and either of the pipes.

Other objects and advantages will appear in the following more detailed description of the invention.

In the accompanying drawing; Fig. 1 is a diagrammatic view, mainly in section, of a fluid pressure brake equipment embodying my invention, the several parts of the equipment being shown in running position; and Fig. 2 is a fragmentary sectional view showing the brake valve device in application position.

As shown in the accompanying drawing, my improved safety car control equipment is of the double end type, and at each end of the car may comprise a brake valve device 1, a foot controlled switch device 2 and a car door controlled switch device 3. The equipment also comprises a double check valve device 4, a brake cylinder 5, a main reservoir 6, a magnet valve device 7, a cut-off valve device 8, a safety control pipe 9, a circuit breaker device 10, a straight air pipe 11 and a main reservoir pipe 12.

Each brake valve device 1 may comprise a casing having a chamber 13 which is constantly connected to the main reservoir 6 through the main reservoir pipe and passage 12 and contains a rotary valve 14 having an operating stem which is rotatable through the medium of the usual removable operating handle 15.

Each foot controlled switch device 2 may comprise a casing having a block 16 of insulating material rigidly mounted therein to which are secured spaced contact terminals 17 and 18 and which are adapted to be engaged by a contact member 19 to close an electric circuit through said terminals. The contact member 19 is carried by the head 20 of a plunger member which is contained in the casing at one side of the block 16 and is movable longitudinally relative to the casing. This plunger also comprises a stem 22 which extends through an opening in the insulating block 16 and which, at one end is secured to the head 20. The other end of the stem 22 is adapted to be engaged by the inner end of a removable foot pedal 23 which intermediate its ends is operatively mounted on a fulcrum pin 24 secured to the casing. Contained in the casing and interposed between and engaging the casing and one side of the plunger head 20 is a spring 25, the pressure of which tends to shift the plunger to the position in which the contact member 19 engages the contact terminals 17 and 18.

Each of the door controlled switch devices 3 may comprise a casing having a block 26 of insulating material rigidly mounted therein to which contact terminals 27 and 28 are secured in spaced relation to each other. Contained in the casing is a contact member 29 which is movable into and out of contact with the contact terminals 27 and 28 to respectively open and close an electric circuit through these terminals. This contact member 29 is secured to a disc of insulating material which is carried by a stem 30 slidably mounted in the casing. A portion of the stem at one side of the contact member extends through an opening in the casing and its extreme outer end is adapted to be engaged by a car door 31 when the door is being closed and when it is closed. Contained in the casing and interposed between and engaging the insulating block 26 and one side of the insulating disc secured to the stem 30 is a spring 32, the pressure of which tends to shift the stem 30 toward the right hand.

Portions only of the car door have been shown and may be of the sliding type. The doors are shown in full lines in their closed position and in dot and dash lines in an open position. For operating the doors any desired mechanisms may be employed but, since the door operating mechanisms do not enter into this invention, they have been omitted.

The double check valve device 4 may comprise a casing containing a double check valve 33, the chamber 34 at one side of which is connected to the straight air pipe 11 and the chamber 35 at the other side is connected to the safety control pipe 9. This check valve 33 is slidable in the casing and in its left hand position, as shown in the drawing, establishes communication between the straight air pipe 11 and a brake cylinder passage and pipe 36, and in its right hand position establishes communication between the brake cylinder passage and pipe 36 and the safety control pipe. With the double check valve in its right hand position, communication between the straight air pipe and the brake cylinder passage and pipe 36 is closed off, and in its left hand position communication between the brake cylinder passage and pipe 36 and safety control pipe 9 is closed off.

The cut-off valve device 8 is interposed in the safety control pipe and may comprise a casing having connecting passages 37 and 38, the passage 37 being connected to a section of pipe 39 which forms a part of the safety control pipe and the passage 38 is connected to the part of the safety control pipe indicated by the reference character 9. Mounted in the casing is a diaphragm valve 40 which is adapted to seat on a seat rib 41 formed in the casing and close off communication between the passages 37 and 38. Also mounted in the casing is a flexible diaphragm 42 which through the medium of follower members 43 and 44 is adapted to control the operation of the valve 40. The chamber 45 at one side of the diaphragm 42 is constantly connected to the straight air pipe 11.

The magnet valve device 7 comprises a magnet 46 and double beat valves 47 and 48 adapted to be operated by the magnet. The valve 47 is contained in a chamber 49 constantly connected to the atmosphere through a passage 65 and the valve 48 is contained in a chamber 50 constantly connected to the main reservoir pipe 12 and is subject to the pressure of a spring 51 also contained in this chamber. Intermediate these chambers 49 and 50 is a chamber 64 which is constantly connected to the section 39 of the safety control pipe, which chamber is adapted to be connected to the chamber 49 or the chamber 50, depending upon the positions of the valves 47 and 48.

The circuit breaker device 10 may comprise a casing containing a piston 52 having a stem 53 extending through and beyond one end of the casing adapted to operate a circuit breaking switch of the usual type (not shown) to open the power circuit to the usual car motors. The chamber 54 at one side of the piston 52 is constantly connected to the section 9 of the control pipe and the chamber 55 at the other side of the piston contains a spring 56 which engages the piston and the casing.

The contact terminal 27 of each door controlled switch device 2 and the contact terminal 17 of the foot controlled switch device at the non-operating end of the car are connected to a current supply wire 57 which is supplied with current from the trolley wire 58. The contact terminals 28 of the door controlled switch devices 2, the contact terminal 17 of the foot controlled switch device at the operating end of the car and one terminal of the magnet 46 are connected by wires 59, the other terminal of the magnet being connected to ground at 60. The contact terminals 18 of the foot controlled switch devices are connected by a wire 61.

With the equipment in running condition as shown in Fig. 1, the brake valve device 1 at the operating end of the car will be in release position and the brake valve device at the non-operating end will be in handle off position, the foot controlled switch device 2 at the operating end of the car will be maintained in foot on position against the pressure of the spring 25 by the foot pressure of the operator, and the foot controlled switch device at the non-operating end of the car will be in pedal off position. Further, the doors 31 will be closed and will maintain the contact members 29 of the switch devices 3 out of contact with the contact terminals 27 and 28.

With the brake valve device at the operating end of the car in release position, the brake cylinder 5 is connected to the atmosphere through pipe and passage 36, chamber 34 in the double check valve device 4, straight air pipe and passage 11, a cavity 62 in the rotary valve 14 of the brake valve device and passage 63. With the brake valve device at the non-operating end of the car in handle off position, the straight air passage 11 and passage 63 are lapped by the rotary valve.

With the foot controlled switch device 2 at the non-operating end of the car in pedal off position, the pressure of the spring 25 acting on the plunger head 20 maintains the contact member 19 in engagement with the contact terminals 17 and 18, so that current is supplied through the wire 61 to the contact 18 of the foot controlled switch device at the operating end of the car, but since with the foot pedal 23 maintained depressed, the contact member 19 is out of engagement with the contact terminals 17 and 18, and the contact members 29 of the door controlled switch device 3 are maintained out of engagement with the contact terminals 27 and 28, no current will be permitted to flow through the magnet 46, so that it will remain deenergized. With the magnet thus maintained deenergized, the pressure of the spring 51 of the magnet valve device maintains the valve 48 seated and the valve 47 unseated. With the valve 47 unseated, the circuit breaker piston chamber 54 and the check valve chamber 35 are connected to the atmosphere through the section 9 of the safety control pipe, passages 38 and 37 in the cut-off valve device, the diaphragm valve 40 being unseated since the chamber 45 is vented with the straight air pipe 11, through section 39 of the safety control pipe chamber 64 in the magnet valve device, past the unseated valve 47, valve chamber 49 and passage 65.

If, when the several parts of the safety car control equipment are in running position as before described, the operator should cause either one or both of the car doors 31 to be opened, an automatic application of the brakes will be effected in the following manner. As either door moves from its closed position, the pressure of the spring 32 of an adjacent switch device 3 causes the stem 30 to move outwardly with the door until the stem is in its extreme outward position in which the contact member 29 engages the contact terminals 27 and 28 and closes the circuit through the magnet 46 and current will flow from the trolley wire 58, through wire 57, contact terminal 27, contact member 29, contact terminal 28, wire 59, magnet 46 and ground 60.

Current flowing over this circuit energizes the magnet 46 which causes the valve 47 to be seated and the valve 48 to be unseated against the pressure of the spring 51. With the valve 47 seated, communication from the safety control pipe to the chamber 49, which is open to the atmosphere, is closed off and with the valve 48 unseated, fluid under pressure supplied to the valve chamber 50 from the main reservoir 6 by way of the main reservoir pipe 12, is supplied to the piston chamber 54 in the circuit breaker device 10 and valve chamber 35 in the double check valve device 4 past the unseated valve 48 through chamber 64, pipe 39, passage 37, past the unseated diaphragm valve 40 of the cut-off valve device, through passage 38 and pipe 9. Fluid under pressure supplied to the piston chamber 54 of the circuit breaker device 10 causes the piston to shift to its extreme right hand position against the pressure of the spring 56 and operate the usual circuit breaker switch device (not shown) to open the car motor circuit.

Since the valve chamber 34 in the double check valve device is vented to the atmosphere by way of the straight air pipe 11 and the brake valve device at the operating end of the car, fluid under pressure supplied to the valve chamber 35 in the double check valve device causes the double check valve 33 to shift to its extreme right hand position, closing off communication between the brake cylinder 5 and the straight air pipe 11 and establishing communication through which fluid under pressure flows from the chamber 35 to the brake cylinder, thus effecting an application of the brakes.

To release such an application of the brakes, the door or doors which have been opened must be returned to closed position. When the doors are closed, the switch devices will have been operated to open the circuit through the magnet 46 of the magnet valve device 7 and the magnet 46 deenergized. Upon the deenergization of the magnet, the pressure of the spring 51 shifts the valve 48 to its seated position and the valve 47 to its unseated position. With the valve 48 seated, the supply of fluid under pressure from the main reservoir to the brake cylinder is closed off and with the valve 47 unseated, fluid under pressure in the brake cylinder is discharged to the atmosphere, thus effecting the release of the brakes.

If, when the several parts of the equipment are in running position, the operator should remove his foot from the foot pedal 23 of the foot switch device 2 at the operating end of the car, the pressure of the spring will cause the plunger head 20 to move downwardly carrying the contact member 29 into engagement with the contact terminals 17 and 18, thus closing the circuit through the magnet 46 of the magnet valve device. With the circuit through the magnet thus closed, current flows from the trolley wire 58, wire 57, contact terminal 17, of the switch device 2 at the non-operating end of the car, contact member 19, contact terminal 18, wire 61, contact terminal 18 of the switch device 2 at the operating end of the car, contact member 19, contact terminal 17, wire 59, through the magnet 46 and ground 60. Current thus flowing through the magnet 46 energizes it and causes it to operate the valves 47 and 48 to effect an automatic application of the brakes in the same manner as just described in connection with an automatic application effected by the opening of a door of the car. To release such an application of the brakes, the operator depresses the foot pedal 23 causing the plunger to move upwardly against the pressure of the spring 25, carrying the contact member 19 out of engagement with the contact terminals 17 and 18, opening the circuit through the magnet 46 causing it to be deenergized, after which the release of the brakes will be effected in the same manner as described in connection with the deenergization of the magnet upon the closing of the car door or doors.

To effect a service application of the brakes, the brake valve device 1 at the operating end of the car is operated to service position, as shown in Fig. 2 of the drawing, in which fluid under pressure from the rotary valve chamber 13 as supplied from the main reservoir 6 through main reservoir pipe and passage 12, is supplied to the brake cylinder by way of a port 66 in the rotary valve 14, straight air passage and pipe 11, chamber 34 in the double check valve device 4 and brake cylinder passage and pipe 36.

Fluid under pressure thus supplied to the straight air pipe 11 also flows to the chamber 45 in the cut-off valve device 8 and fluid under pressure in this chamber flexes the diaphragm 42 upwardly causing the diaphragm valve 40 to seat on the seat rib 41 and close communication through the safety control pipe. If, when the diaphragm valve is thus seated, a door should be opened or the operator remove his foot from the foot pedal 23 of the foot switch device, an automatic application of the brakes will not be effected nor will the circuit breaker device be operated to cause the opening of the car motor circuit.

In this connection, it will be noted that the area of the flexible diaphragm 42 over which fluid under pressure supplied to the chamber 45 acts is much greater than the area of the diaphragm valve which is exposed to the fluid pressure supplied by the magnet valve device when the magnet 46 is energized upon the removal of the operator's foot from the foot pedal 23 or upon the opening of a car door so that the valve 40 will be maintained seated when a full service application of the brakes is effected.

To release a service application of the brakes, the brake valve device 1 at the operating end of the car is moved to release position in which fluid under pressure is discharged from the brake cylinder to the atmosphere by way of pipe and passage 36, valve chamber 34 in the double check valve device, straight air pipe and passage 11, cavity 62 in the rotary valve of the brake valve device and passage 63. When fluid under pressure is thus vented from the straight air pipe and the chamber 45 in the cut-off valve device, the flexible diaphragm will flex downwardly to its normal position as shown in Fig. 1, permitting the diaphragm valve 40 to move away from its seat rib 41 and again establish communication through the safety control pipe.

If the magnet 46 should be energized when the brake valve device is moved to release position and the pressure of fluid is being reduced in the diaphragm chamber 45, the pressure of fluid supplied by the magnet valve device and acting on one side of the diaphragm valve 40 will cause said valve to move from its seat so that fluid under pressure will be supplied to the circuit breaker device and to the valve chamber 35 of the double check valve device 4 and since the pressure of fluid in the chamber 34 is reduced through the venting of the straight air pipe 11, fluid under main reservoir pressure in the chamber 35 causes the double check valve 33 to shift to its right hand position, closing off the atmospheric communication from the brake cylinder and establishing communication through which fluid under pressure flows from the valve chamber 35 to the brake cylinder, thus maintaining the brakes applied until such time as the magnet 46 is deenergized. It will thus be seen that the brakes cannot be released if a door is open or if the operator fails to depress the foot pedal of the foot valve device.

In changing ends, the operator, after bringing the car to a stop by a straight air application of the brakes, moves the brake valve handle 15 to lap handle off position and removes it from the brake valve device. He also removes his foot from the foot pedal 23 of the foot valve device and the pressure of the spring shifts the plunger head 20 downwardly so that the connector 19 engages the contact terminals 17 and 18, closing the circuit through the magnet 46 of the magnet valve device 7, energizing the magnet. Since a straight air application of the brakes has been effected, the cut-off valve device will prevent the flow of fluid from the magnet valve device to the circuit breaker device 10 and the valve chamber 35 in the double check valve device 4, so that the energization of the magnet 46 will have no effect on the brake application already made. The operator now removes the foot pedal 23.

The handle 15 is now mounted on the operating stem of the brake valve device at the non-operating end of the car and the foot pedal 23 is operatively mounted in the casing of the foot switch device at the same end of the car.

Now to release the brakes, the operator depresses the foot pedal 23, opening the circuit through the magnet 46, deenergizing the magnet and then moves the brake valve device to release position in which the brakes are released in the same manner as described in connection with the release of the brakes by the use of the brake valve device at the operating end of the car.

While one illustrative embodiment of the invention has been described in detail, it is Having described my invention, what I claim as new and desire to secure by Letters Patent, is:

1. In a safety car control equipment, the combination with a brake cylinder, of a safety control pipe through which fluid under pressure is adapted to be supplied to and released from the brake cylinder to apply and release the brakes, a straight air pipe through which fluid under pressure is adapted to be supplied to and released from the brake cylinder to apply and release the brakes, means subject to fluid under pressure supplied through one of said pipes for closing communication from the brake cylinder to the other of said pipes, and a valve operative by fluid under pressure supplied through said straight air pipe for preventing the flow of fluid through said safety control pipe to said means.

2. In a safety car control equipment, the combination with a brake cylinder, of a safety control pipe through which fluid under pressure is adapted to be supplied to and released from the brake cylinder to apply and release the brakes, a straight air pipe through which fluid under pressure is adapted to be supplied to and released from the brake cylinder to apply and release the brakes, a double check valve device subject to fluid under pressure supplied through either one of said pipes for closing communication from the brake cylinder to the other one of said pipes, and a valve operative by fluid under pressure supplied through said straight air pipe for preventing the flow of fluid through the safety control pipe to said double check valve device.

3. In a safety car control equipment, the combination with a safety control pipe through which fluid under pressure is adapted to be supplied to effect an application of the brakes, electrically controlled means normally deenergized and connecting said pipe to the atmosphere and operative upon energization to supply fluid under pressure to said pipe, a door for the car, an electric circuit for said electrically controlled means, a manually controlled switch device subject to manual pressure for maintaining said circuit open and operative upon the relief of manual pressure to close said circuit, a switch device operative, upon the opening of said door, to close said circuit, each of said switch devices being adapted to close the circuit independently of the other, a straight air pipe through which fluid under pressure is adapted to be supplied to effect an application of the brakes, and valve means operative to close communication through the safety control pipe from the electrically controlled means to the brake cylinder when fluid is supplied to the brake cylinder through the straight air pipe.

4. In a safety car control equipment, the combination with a safety control pipe through which fluid under pressure is adapted to be supplied to effect an application of the brakes, electrically controlled means normally deenergized and connecting said pipe to the atmosphere and operative upon energization to supply fluid under pressure to said pipe, a door for the car, an electric circuit for said electrically controlled means, a manually controlled switch device subject to manual pressure for maintaining said circuit open and operative upon the relief of manual pressure to close said circuit, and a switch device held in position to open said circuit by said door when the door is closed and operative, upon the opening of said door, to close said circuit, either one of said switch devices being ineffective to open said circuit while the circuit is closed by the other one of said switch devices, a straight air pipe through which fluid under pressure is adapted to be supplied to effect an application of the brakes, and valve means operative to close communication through the safety control pipe from the electrically controlled means to the brake cylinder when fluid is supplied to the brake cylinder through the straight air pipe.

5. In a safety car control equipment, the combination with a safety control pipe through which fluid under pressure is adapted to be supplied to effect an application of the brakes, electrically controlled means operative upon energization to supply fluid under pressure to said pipe and operative upon deenergization to vent fluid under pressure from said pipe, a door for the car, manually controlled means for controlling the energization and deenergization of said electrically controlled means, door controlled means for controlling the energization and deenergization of said electrically controlled means, either of said controlled means being operative to cause the energization of said electrically controlled means independently of the other and either being adapted to render the other ineffective to cause the deenergization of said electrically controlled means, a straight air pipe through which fluid under pressure is adapted to be supplied to effect an application of the brakes, and valve means operative to close communication through the safety control pipe from the electrically controlled means to the brake cylinder when fluid is supplied to the brake cylinder through the straight air pipe.

6. In a safety car control equipment, the combination with a brake cylinder, of a straight air application pipe through which fluid under pressure is normally supplied to and released from the brake cylinder to effect an application and release of the brakes, a manually operative valve device for controlling the flow of fluid under pressure to and from said application pipe, a safety control pipe through which fluid under pressure is adapted to be supplied to and released from the brake cylinder, a door for the car, means operative upon the incapacitation of an operator or the opening of said door for supplying fluid under pressure to the safety control pipe, and a valve operative by fluid under pressure supplied through the application pipe for preventing the flow of fluid through the safety control pipe to the brake cylinder.

7. In a safety car control equipment, the combination with a brake cylinder, of a straight air application pipe through which fluid under pressure is normally supplied to and released from the brake cylinder to effect an application and release of the brakes, a manually operative valve device for controlling the flow of fluid under pressure to and from said application pipe, a safety control pipe through which fluid under pressure is adapted to be supplied to and released from the brake cylinder, a door for the car, means operative upon the incapacitation of an operator or the opening of said door for supplying fluid under pressure to the control pipe, and valve means operative by fluid supplied through the application pipe to the brake cylinder to close off the flow of fluid to the brake cylinder through the safety control pipe.

8. In a safety car control equipment, the combination with a brake cylinder, of a straight air application pipe through which fluid under pressure is normally supplied to and released from the brake cylinder to effect an application and release of the brakes, a manually operative valve device for controlling the flow of fluid under pressure to and from said application pipe, a safety control pipe through which fluid under pressure is adapted to be supplied to and released from the brake cylinder, a door for the car, means operative upon the incapacitation of an operator or the opening of said door for supplying fluid under pressure to the safety control pipe, and a check valve operative by fluid under pressure supplied through said application pipe for closing communication from the brake cylinder to the control pipe and operative by fluid under pressure supplied through the control pipe for closing communication from the brake cylinder to the application pipe, and a valve interposed in the safety control pipe operative when fluid under pressure is supplied through the straight air application pipe for preventing the flow of fluid through said control pipe to said check valve.

In testimony whereof I have hereunto set my hand, this 17th day of April, 1930.

JOSEPH C. McCUNE.